(12) United States Patent
Ishikawa (10) Patent No.: US 6,429,980 B1
(45) Date of Patent: *Aug. 6, 2002

(54) LENS BARREL

(75) Inventor: Masanori Ishikawa, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/433,892

(22) Filed: Nov. 4, 1999

(30) Foreign Application Priority Data

Nov. 9, 1998 (JP) ............................................. 10-331933
Oct. 19, 1999 (JP) ............................................. 11-296812

(51) Int. Cl.$^7$ .......................... G02B 15/14; G02B 27/64
(52) U.S. Cl. .................... 359/704; 359/694; 359/695; 359/555; 359/556
(58) Field of Search ................................. 359/704, 694, 359/693, 823, 396, 554, 555, 556

(56) References Cited

U.S. PATENT DOCUMENTS 4,417,788 A * 11/1983 Alvarez ....................... 359/556
6,038,072 A * 3/2000 Hirunuma ..................... 359/557
6,064,532 A * 5/2000 Enomoto ...................... 359/694
6,078,436 A * 6/2000 Hirunuma et al. ........... 359/694

* cited by examiner

Primary Examiner—Georgia Epps
Assistant Examiner—Timothy J. Thompson
(74) Attorney, Agent, or Firm—Robin, Blecker & Daley (57) ABSTRACT

In a lens barrel having a first holding tube holding a first optical system and a second holding tube holding a second optical system, support rollers are arranged at three parts on the periphery of each of the first and second holding tubes to restrain these optical systems from tilting. The positions of the support rollers are arranged to be respectively shifted from the centers of gravity of the holding tubes either forward or rearward in the direction of an optical axis. If the direction in which an image plane is caused to tilt by tilting of one of the two optical systems is opposite to the direction in which the image plane is caused to tilt by tilting of the other, the tilts of the image plane caused by the tilting movements of the two optical systems are arranged to offset and cancel each other by setting, for example, the support rollers of the first holding tube in rear of the center of gravity of the first holding tube and the support rollers of the second holding tube also in rear of the center of gravity of the second holding tube.

7 Claims, 7 Drawing Sheets

LENS BARREL

BACKGROUND OF THE INVENTION

1. Field of the Invention

The present invention relates to a lens barrel having an image-shake correcting optical system arranged to correct image shakes caused by vibrations imparted to an optical apparatus and an optical system arranged to move along an optical axis during focusing or zooming.

2. Description of Related Art

The cameras of nowadays are arranged, by the art of automatic exposure and the art of automatic focusing, to automatically decide an exposure and automatically drive a focusing optical system. Therefore, the probability of failure in taking pictures has become very small even for persons unfamiliar with camera operations.

Further, studies and researches for correction of image shakes due to vibrations imparted to cameras have advanced. Therefore, factors of a photo-taking failure have almost completely been removed for camera users.

In brief, the system for correcting image shakes due to camera vibrations is described as follows. The camera vibration taking place in taking a shot is about 1 to 12 Hz in frequency. To permit photo-taking without any image shake even in the event of camera vibration, the image-shake correcting system is basically arranged to detect the camera vibration and to displace a correction lens according to the value of vibration thus detected.

Therefore, for this purpose, it is necessary, first of all, to accurately detect the camera vibration and then to correct an optical axis deviation caused by the camera vibration by displacing a correction lens according to the result of detection.

Theoretically, the vibrations of a camera can be detected by providing the camera with a vibration detecting means for detecting acceleration, angular velocity, etc., and a displacement information output means for outputting displacement information by electrically or mechanically integrating an output signal of the vibration detecting means. Image shakes can be corrected by controlling, according to the displacement information, a correcting optical unit disposed within an image-shake correcting device which is arranged to vary a photo-taking optical axis by displacing a correcting optical system.

Conventional known driving means for driving the correcting optical system include a driving device, in which a coil and a magnet are used, the coil or the magnet is disposed at a fixed part, the magnet or the coil is disposed at the correcting optical system, and a driving part is arranged to drive the correcting optical system by applying a current to the coil. This driving device is arranged in two units and in a pair. The two units are arranged respectively to detect vibrations vertically and horizontally taking place (hereinafter referred to as "pitch" and "yaw" directions), with the camera set in its normal posture, and to drive the correcting optical system independently of each other in the two directions according to the respective vibrations detected.

However, when the camera is arranged to drive the image-shake correcting optical system in addition to driving a focusing optical system or a magnification varying optical system, the increase in number of optical systems to be driven results in an increase in number of such optical systems that are tilted by a change in the photo-taking posture of the camera. If a tilt takes place in an optical system under such a condition, the optical performance of the camera tends to deteriorate because, for example, an image would be formed on the front side or on the rear side of a film surface at an upper, lower, right or left part of the film surface, although the image can be adequately formed on the film surface at the center thereof.

Such a tilt must be suppressed by minimizing the clearance or play of each driving part, therefore. However, the efforts to minimize the play of each driving part cause an increase in driving load to greatly deteriorate the characteristic of driving, particularly, with regard to the driving of the focusing optical system or the image-shake correcting optical system, which is automatically driven.

BRIEF SUMMARY OF THE INVENTION

The invention is directed to the solution of the problem of the prior art described above. It is, therefore, an object of the invention to provide a lens barrel arranged to be capable of preventing the optical performance thereof from being deteriorated by tilting of optical systems without deteriorating the driving characteristics for driving a focusing optical system, a magnification varying optical system and an image-shake correcting optical system.

To attain the above object, according to the invention, positions of support parts or protruding parts for respectively restraining tilts of optical axes of a focusing optical system and an image-shake correcting optical system, which are shifted forward or rearward in an optical axis direction with respect to respective positions of centers of gravity of the focusing optical system and the image-shake correcting optical system, are set in correspondence with the relationship between tilts of the focusing optical system and the image-shake correcting optical system and directions of tilts of an image plane resulting from the tilts of the focusing optical system and the image-shake correcting optical system.

More specifically, according to one aspect of the invention, there is provided a lens barrel comprising a first holding tube holding a first optical system arranged to be driven in a direction perpendicular to an optical axis for correcting an image shake, a second holding tube holding a second optical system arranged to be moved along the optical axis, a first plurality of projections arranged at the first holding tube to protrude perpendicularly to the optical axis for restraining the first optical system from tilting with respect to the optical axis, and a second plurality of projections arranged at the second holding tube to protrude perpendicularly to the optical axis for restraining the second optical system from tilting with respect to the optical axis, wherein positions of the first plurality of projections and the second plurality of projections are respectively shifted with respect to positions of centers of gravity of the first holding tube and the second holding tube in the optical axis direction.

In particular, in the lens barrel, the positions of the first plurality of projections and the second plurality of projections are shifted in phase.

Further, in the lens barrel, if a direction of tilting of an image plane caused by tilting of the first optical system and a direction of tilting of the image plane caused by tilting of the second optical system are the same, a direction in which the position of the first plurality of projections is shifted with respect to the position of the center of gravity of the first holding tube and a direction in which the position of the second plurality of projections is shifted with respect to the position of the center of gravity of the second holding tube are opposite to each other.

Further, in the lens barrel, otherwise, if a direction of tilting of an image plane caused by tilting of the first optical system and a direction of tilting of the image plane caused by tilting of the second optical system are opposite to each other, a direction in which the position of the first plurality of projections is shifted with respect to the position of the center of gravity of the first holding tube and a direction in which the position of the second plurality of projections is shifted with respect to the position of the center of gravity of the second holding tube are the same.

Further, in the lens barrel, the second optical system is arranged to move along the optical axis for focusing.

Further, in the lens barrel, the second optical system is arranged to move along the optical axis for zooming.

The above and further objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
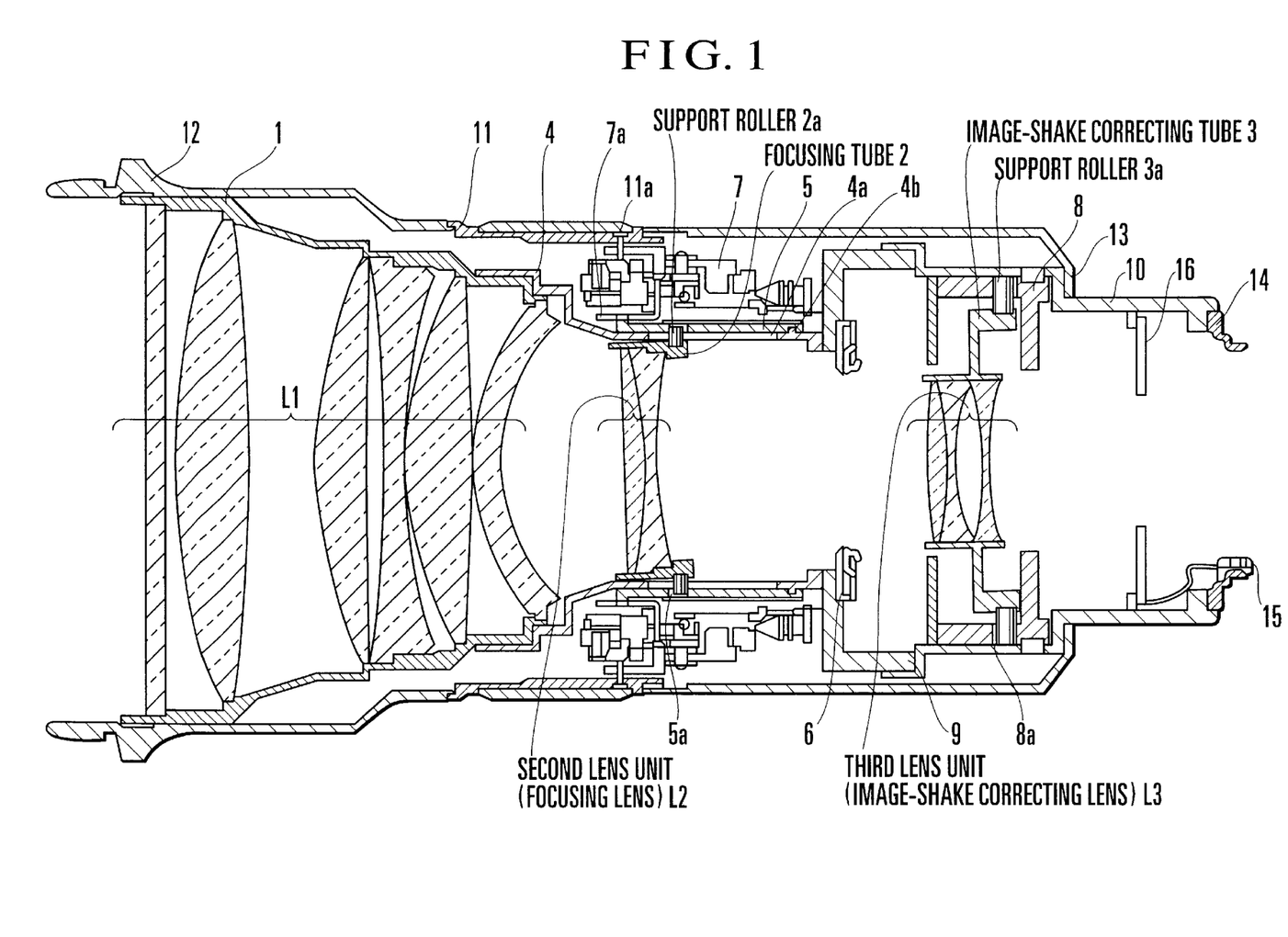
FIG. 1 is a longitudinal sectional view of a lens barrel according to a first embodiment of the invention.
Figure 2:
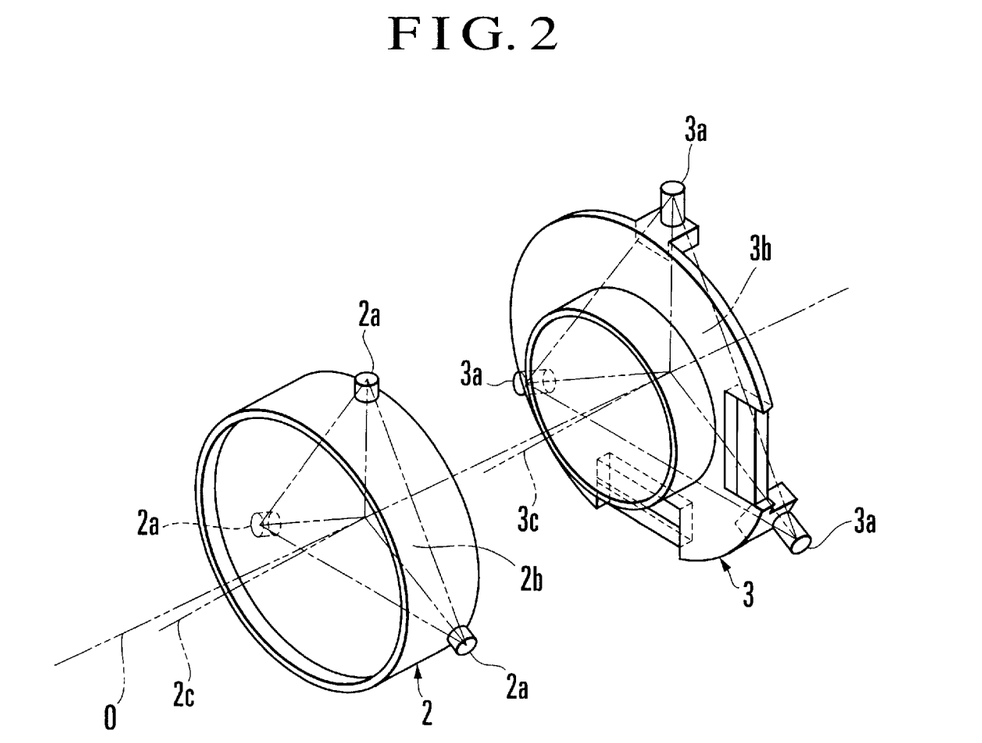
FIG. 2 is a perspective view showing essential parts of the lens barrel shown in FIG. 1.

FIG. 1 is a longitudinal sectional view of a lens barrel according to a first embodiment of the invention. FIG. 2 is a perspective view showing essential parts of the lens barrel.

Figure 3:
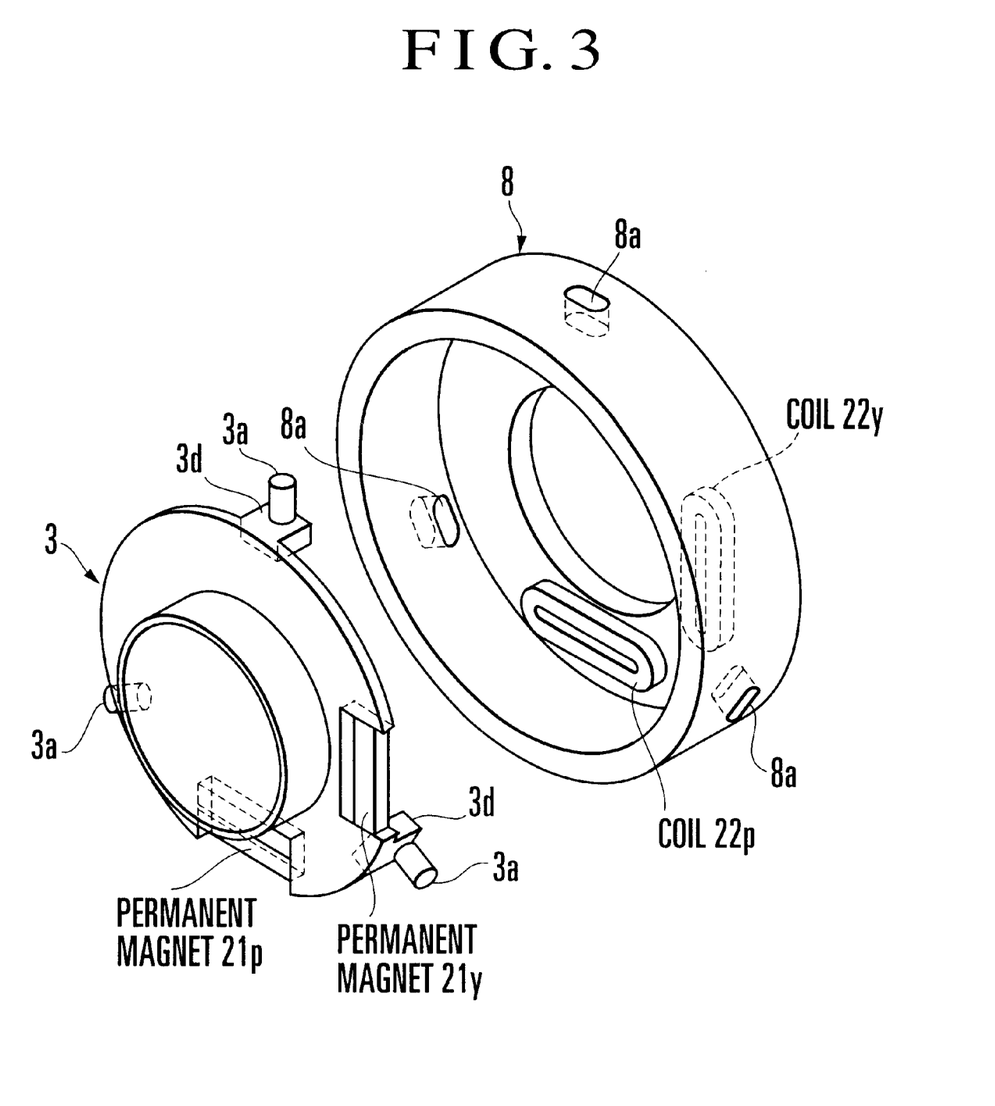
FIG. 3 is an exploded perspective view of an image-shake correcting device of the lens barrel shown in FIG. 1.

Referring to FIGS. 1 and 2, the lens barrel includes a first lens unit L1, a second lens unit L2 which is a focusing lens, and a third lens unit L3 which is an image-shake correcting lens. A first-lens-unit tube 1 is arranged to hold the first lens unit L1 and is mounted on a guide tube 4 integrally therewith. A focusing tube 2 is arranged to hold the second lens unit L2. The focusing tube 2 engages the guide tube 4 and a cam ring 5 and is arranged to be driven in the direction of an optical axis and to have three support rollers 2a arranged on its outer circumferential side. The support rollers 2a protrude perpendicular to the optical axis to support the focusing tube 2 and to restrain tilting of the focusing tube 2 at three parts and are arranged to have some amount of play with respect to the guide tube 4 and the cam ring 5 in such a way as to allow the focusing tube 2 to be driven without any excessive load. An image-shake correcting tube 3 holds the third lens unit L3. As shown in FIG. 3, the image-shake correcting tube 3 is arranged to be driven in a state of engaging a third-lens-unit holding frame 8 and to have three support rollers 3a on its outer circumferential side. The support rollers 3a protrude perpendicular to the optical axis to support the image-shake correcting tube 3 and to restrain tilting of the image-shake correcting tube 3 and are arranged to have some amount of play with respect to the third-lens-unit holding frame 8 in such a way as to allow the image-shake correcting tube 3 to be driven without any excessive load.

The guide tube 4 is mounted on a connection tube 9 integrally therewith and is provided with three rectilinear motion grooves 4a which engage the support rollers 2a of the focusing tube 2 and extend in parallel with the optical axis and also with a projection 4b which is arranged to restrict the position of the cam ring 5 in the direction of the optical axis. The cam ring 5 is fitted on the outer surface of the guide tube 4 and is rotatably held by the projection 4b of the guide tube 4 in such a way as to have its position restricted in the direction of the optical axis. The cam ring 5 has three cam grooves 5a which engage the support rollers 2a of the focusing tube 2. A diaphragm 6 is mounted on the connection tube 9 integrally therewith and is arranged to be driven by an actuator (not shown). A focusing actuator 7 is mounted on the guide tube 4 integrally therewith. The cam ring 5 is thus arranged to be driven to rotate, through a key 7a, by combining a rotation of a focusing operation ring 11 with a rotation caused by an ultrasonic motor disposed within the actuator 7.

The third-lens-unit holding frame 8 is mounted on a fixed tube 10 integrally therewith and has guide slots 8a which engage the support rollers 3a of the image-shake correcting tube 3. The guide slots 8a extend in the direction of circumference to restrict the movement and tilting of the image-shake correcting tube 3 in the optical direction while permitting the image-shake correcting tube 3 to vertically and laterally move with respect to the optical axis. The third-lens-unit holding frame 8 is provided with some part (not shown) for driving the image-shake correcting tube 3. The details of that driving part will be described later herein.

The connection tube 9 is arranged mainly to connect the guide tube 4 to the fixed tube 10. The fixed tube 10 is arranged to have the connection tube 9, the third-lens-unit holding frame 8, an electric circuit board 16 and a mount 14 mounted thereon. The focusing operation ring 11 is rotatably interposed between a front external ring 12 and a rear external ring 13 and is arranged to be rotated by the user. The rotation of the focusing operation ring 11 is transmitted to the focusing actuator 7 through a pin 11a.

The front external ring 12 is mounted on the first lens unit tube 1 integrally therewith. The rear external ring 13 is mounted on the fixed tube 10 integrally therewith. The mount 14 is arranged to permit the lens barrel to be mounted on a camera (not shown) by engaging the camera. An electric contact part 15 is provided on the mount 14 for communication with the camera and arranged to be in contact with an electric contact part disposed on the side of the camera and also to receive power from the camera. The electric circuit board 16 has a microcomputer, etc., mounted thereon to form an electrical circuit. The electric circuit board 16 which is thus arranged to conduct communication and receive power from the camera through the electric contact part 15 is arranged to control the focusing actuator 7, a diaphragm operating actuator (not shown) and an image-shake correcting actuator (not shown) through a printed circuit board (not shown).

Here, it is assumed that, when the second lens unit L2 serving as a focusing lens comes to tilt, a direction in which an image plane tilts is the same as a direction in which the second lens unit L2 tilts.

Further, it is assumed that, when the third lens unit L3 serving as an image-shake correcting lens comes to tilt, the direction in which the image plane tilts is opposite to a direction in which the third lens unit L3 tilts.

Referring to FIG. 1, the support rollers 2a are disposed in rear of the center of gravity of the focusing tube 2 as viewed in the optical axis direction. Therefore, in the state shown in FIG. 1, the second lens unit L2 tilts forward. Further, the support rollers 3a are disposed in rear of the center of gravity of the image-shake correcting tube 3 as viewed in the optical axis direction. Therefore, while the forward tilt of the second lens unit L2 is causing the image plane to tilt forward, the forward tilt of the third lens unit L3 acts to tilt the image plane rearward. The tilting movements of the first and second lens units L2 and L3 thus counteract to offset each other.

The phase of the support rollers 2a of the focusing tube 2 is arranged to be about the same as that of the support rollers 3a of the image-shake correcting tube 3. This arrangement effectively works against the tilting of the lens units L2 and L3 as described below with reference to FIG. 2.

The support rollers 2a of the focusing tube 2 and the support rollers 3a of the image-shake correcting tube 3 are respectively evenly spaced at three parts. The optical axis 2c of the focusing tube 2 and the optical axis 3c of the image-shake correcting tube 3 are in parallel with directions perpendicular to planes 2b and 3b passing through these support rollers 2a and 3a which are evenly spaced respectively at three parts. With the supports rollers 2a and 3a thus arranged to be in phase, the plane 2b passing the three support rollers 2a and the plane 3b passing the three support rollers 3a tilt almost in parallel with each other when they tilt due to the play of the focusing tube 2 and that of the image-shake correcting tube 3. Therefore, the optical axes 2c and 3c of the second and third lens units L2 and L3 come to tilt almost in the same direction with respect to the optical axis 0 of the whole optical system of the lens barrel.

Arrangement of essential parts of the correcting optical device provided for image-shake correction in the first embodiment is next described.

Referring to FIG. 3, permanent magnets 21p and 21y are secured with an adhesive to the image-shake correcting tube 3 to extend in directions orthogonally intersecting each other. Coils 22p and 22y are mounted on the third-lens-unit holding frame 8 to extend in directions orthogonally intersecting each other on a face confronting the permanent magnets 21p and 21y disposed on the image-shake correcting tube 3. Arm parts 3d are formed and evenly spaced on the outer circumferential edge of the image-shake correcting tube 3 to extend in three directions which are in parallel with the optical axis. The support rollers 3a are secured with screws to these arm parts 3d. As mentioned above, the support rollers 3a are engaging the guide slots 8a of the third-lens-unit holding frame 8 in such a way as to be movable in the direction of circumference. In other words, the image-shake correcting tube 3 is thus arranged to be slidable in all directions within a plane containing the third-lens-unit holding frame 8 and has its position restricted only in the direction of the optical axis.

In addition to the above-stated arrangement, a vibration detecting means including an angular velocity sensor (not shown) and a position detecting means including a photo-reflector (not shown) are arranged to detect vibrations taking place in the directions of pitch and yaw. Then, in accordance with the detection output of the vibration detecting means, the permanent magnets 21p and 21y are caused to exert their thrust forces respectively by energizing the coils 22p and 22y. With the permanent magnets 21p and 21y thus caused to act, the image-shake correcting tube 3 to which the permanent magnets 21p and 21y are attached is driven to move. An image-shake correction is performed by thus driving the image-shake correcting tube 3 to a target position while detecting the position of the image-shake correcting tube 3 with the position detecting means.

Figure 4:
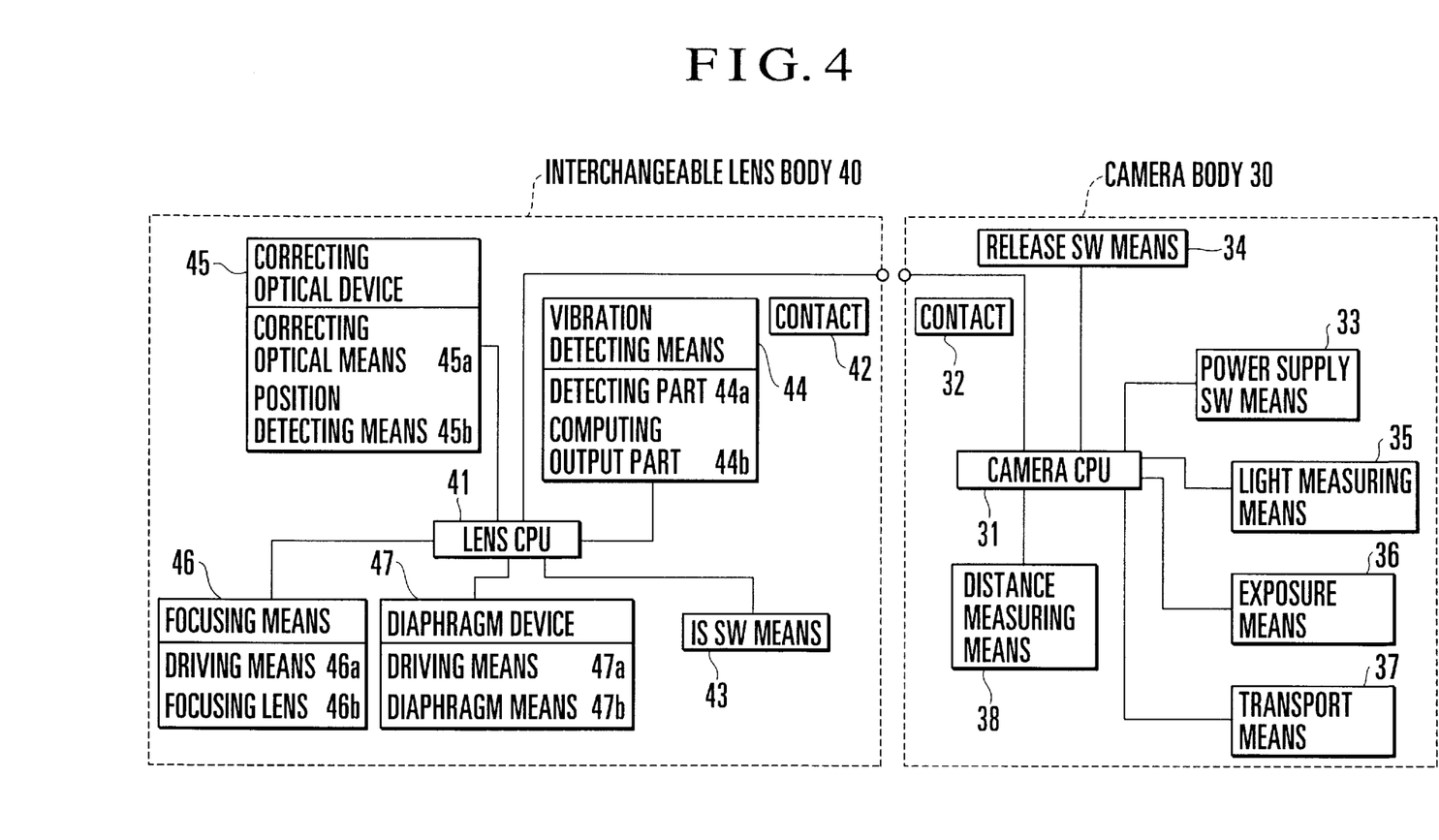
FIG. 4 is a block diagram showing the arrangement of a camera system having the lens barrel shown in FIG. 1.

FIG. 4 is a block diagram of a lens-changeable automatic-focusing type camera system on which an image-shake correcting device including the correcting optical device arranged as described above is mounted.

In FIG. 4, reference numeral 30 denotes a camera body. Reference numeral 40 denotes an interchangeable lens body. A CPU 31 which is disposed within the camera body 30 (hereinafter referred to as the camera CPU) is composed of a microcomputer. The camera CPU 31 is arranged not only to control the actions of various devices within the camera body 30 but also to communicate with a CPU 41 which is disposed within the lens body 40 (hereinafter referred to as the lens CPU), through a contact part 32 on the side of camera body 30, with the lens body 40 mounted on the camera body 30. The camera-side contact part 32 is composed of a signal transmitting contact for transmitting signals to the lens body 40 and a power supply contact for supplying electric power to the lens body 40. A power supply switch means 33 is operable from outside and is arranged to activate the camera CPU 31 to supply electric power to the actuators and sensors within the system and to render the system operative. A release switch means 34 is of a two-step stroke type operatable from outside. The signal of the release switch means 34 is supplied to the camera CPU 31. The camera body 30 further includes a light measuring means 35, an exposure means 36, a transport means 37 and a distance measuring means 38. With the first-stroke switch (SW1) of the release switch means 34 turned on, an instruction for starting a distance measuring action is sent from the camera CPU 31. Then, in accordance with the instruction, the distance measuring means 38 measures a distance to an object located within a distance measuring area and decides an amount of movement of the focusing lens necessary for focusing on the object. The focusing-lens moving amount thus decided is sent to the camera CPU 31.

The lens CPU 41 is composed of a microcomputer. A lens-side contact part 42 corresponds to the electric contact 15 shown in FIG. 1 and includes a contact for receiving signals transmitted from the camera body 30 and a contact for receiving electric power supplied from the camera body 30. An image stabilizing (IS) switch means 43 is operatable from outside and is arranged to permit selection of an image-shake correcting action (IS action) by turning the IS switch means 43 on. A vibration detecting means 44 is composed of a detecting part 44a and a computing output part 44b. The detecting part 44a is arranged to detect, according to an instruction from the lens CPU 41, the acceleration, angular velocity or the like of vibrations taking place in the vertical (pitch) and horizontal (yaw) directions of the camera. The computing output part 44b is arranged to electrically or mechanically integrate a signal outputted from the detecting part 44a to obtain displacement information and to send the displacement information to the lens CPU 41.

A correcting optical system driving means 45 is the correcting optical device shown in FIG. 3. The correcting optical device 45 is composed of a correcting optical means 45a and a position detecting means 45b. The correction optical means 45a includes a first driving means composed of the permanent magnet 21p and the coil 22p which are arranged to drive the third lens unit L3 in the direction of pitch and a second driving means composed of the permanent magnet 21y and the coil 22y which are arranged to drive the third lens unit L3 in the direction of yaw. The position detecting means 45b is arranged to detect the position of the third lens unit L3. A focusing means 46 is composed of the second lens unit L2, the focusing tube 2 and the focusing actuator 7 which are shown in FIG. 1. The focusing means 46 includes a driving means 46a and a focusing lens 46b. The driving means 46a is arranged to be controlled by the lens CPU 41 according to information on a focusing-lens moving amount sent from the camera CPU 31. The focusing lens 46b is arranged to be driven by the driving means 46a. A diaphragm device 47 corresponds to the diaphragm 6 shown in FIG. 1 and is composed of a driving means 47a and a diaphragm means 47b. The driving means 47a is arranged to be controlled by the lens CPU 41 according to a diaphragm driving instruction sent from the camera CPU 31. The diaphragm means 47b is arranged to be driven by the driving means 47a in such a way as to determine the area of the aperture thereof.

With the release switch means 34 operated, the camera CPU 31 acts according to a signal inputted from the release switch means 34. If the signal indicates that the first stroke switch (SW1) is turned on, the camera CPU 31 decides an amount of exposure through the light measuring means 35 and performs a focusing action through the distance measuring means 38 to make the camera ready for a photo-taking operation. When the second stroke switch (SW2) is found to be turned on, the camera CPU 31 sends a diaphragm operating instruction to the lens CPU 41 disposed within the lens body 40. At the same time, the camera CPU 31 sends an exposure starting instruction to the exposure means 36 to cause the exposure means 36 to perform an exposure action. Upon receipt of an exposure completion signal, the camera CPU 31 sends a transport starting instruction to the transport means 37 to cause the transport means 37 to perform a film winding action.

Figure 5:
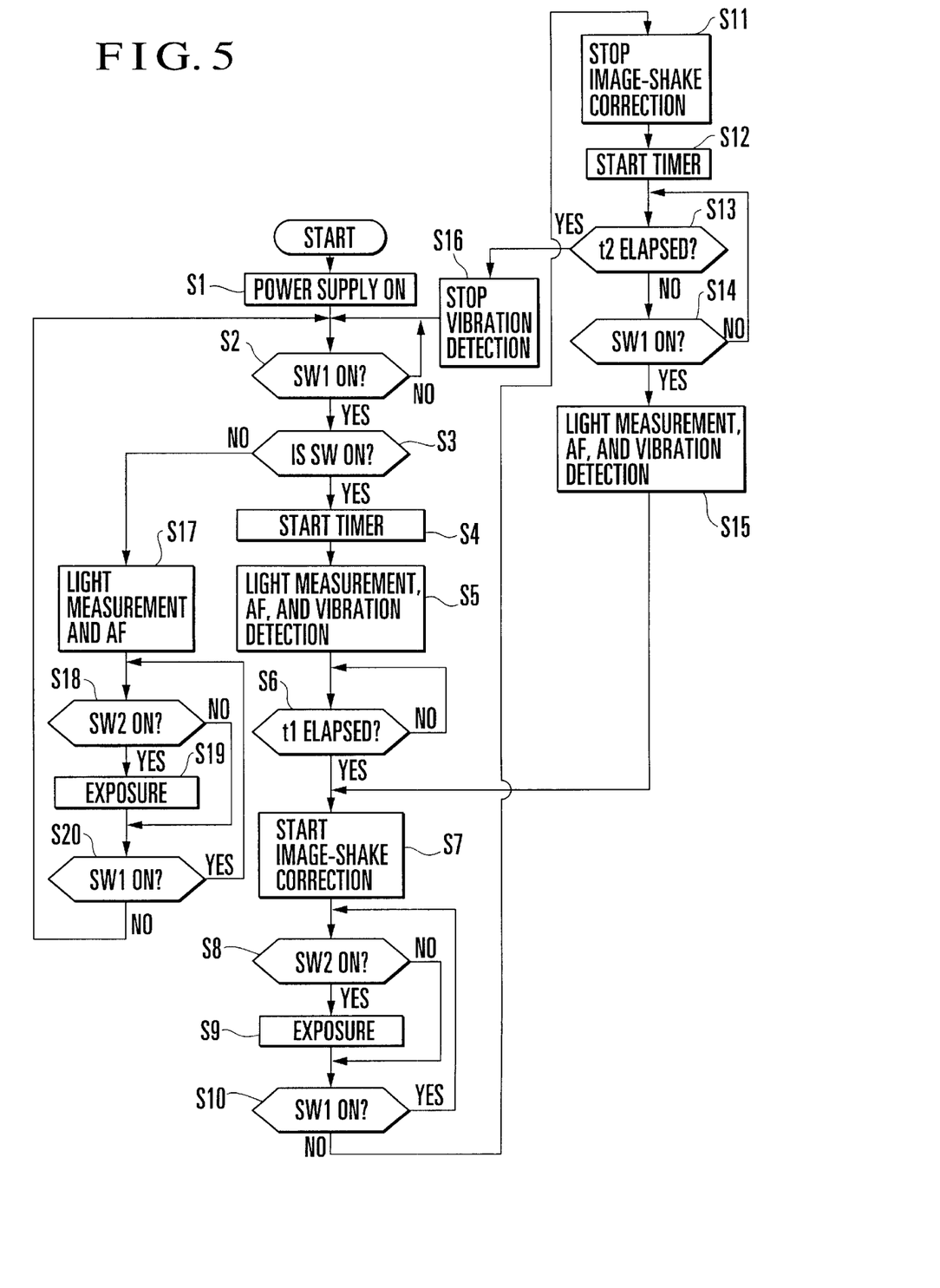
FIG. 5 is a flow chart showing a main operation of the camera system shown in FIG. 4.

The above-stated actions of the camera system in the first embodiment of the invention are next described below referring to a flow chart of FIG. 5.

At a step S1, the power supply switch means 33 is turned on to supply electric power to the lens body 40. In cases where a new battery is put in or where the lens body 40 is mounted on the camera body 30, communication begins between the camera body 30 and the lens body 40.

At a step S2, a check is made to find if a signal of the switch SW1 of the release switch means 34 is generated. If so, the flow of operation proceeds to a step S3. At the step S3, the lens CPU 41 makes a check for the on-state of the IS (image stabilizing) switch means 43 to find if the IS action is selected. If so, the flow proceeds to a step S4. If not, the flow proceeds to a step S17.

At the step S4, the lens CPU 41 causes a timer disposed therein to start a time count. The flow then proceeds to a step S5. At the step S5, the camera CPU 31 performs a light measuring action and an AF (distance measuring) action. The lens CPU 41 begins to perform focusing and vibration-detecting actions. The flow then proceeds from the step S5 to a step S6.

At the step S6, a check is made for the time count by the timer to find if the time count has reached a predetermined length of time t1. If so, the flow proceeds to a step S7. If not, the flow stays at the step S6 until the time count reaches the predetermined time t1. This process is provided for waiting time required until the output of the vibration detecting means 44 becomes stable.

At a step S7, after the lapse of the time t1, image-shake correcting control begins to be performed by driving the correcting optical means 45a on the basis of the output of the position detecting means 45b and a target value signal set according to the output of the vibration detecting means 44.

At a step S8, the camera CPU 31 makes a check to find if the signal of the switch SW2 of the release switch means 34 has been generated. If so, the flow proceeds from the step S8 to a step S9. If not, the flow proceeds to a step S10.

At the step S9, an exposure action is carried out on the film with the diaphragm device 47 controlled by the lens CPU 41 and the exposure means 36 controlled by the camera CPU 31. The flow then proceeds to the step S10.

At the step S10, the camera CPU 31 again makes a check to find if the signal of the switch SW1 of the release switch means 34 is generated. If so, the flow comes from the step S10 back to the step S8. If not, the flow proceeds to a step S11.

At the step S11, the lens CPU 41 brings the image-shake correcting control to a stop. The flow then proceeds to a step S12.

At the step S12, upon completion of the above-stated action, the lens CPU 31 resets the timer and, after that, causes the timer to restart its time count. The flow then proceeds from the step S12 to a step S13.

At the step S13, the lens CPU checks the state of the time count of the timer to find if it has reached a predetermined length of time t2. If not, the flow proceeds from the step S13 to a step S14. If so, the flow proceeds to a step S16.

At the step S14, a check is made again for the generation of the signal of the switch SW1 to find if the signal is generated before the lapse of the predetermined time t2. If not, the flow returns to the step S13. If so, i.e., if the signal of the switch SW1 is found to be generated within the predetermined length of time t2 after the image-shake correcting is brought to a stop, the flow proceeds from the step S14 to a step S15.

At the step S15, the light measuring and AF actions (distance-measuring and focusing actions) are performed. Then, since the vibration detecting process is still carried on, the correcting optical means 45a is driven at once on the basis of a target value signal and the output of the position detecting means 45b. The flow then returns to the step S7 to resume the image-shake correcting control.

After that, the above-stated actions are repeated in the same manner. Execution of processes in the above-stated manner effectively eliminates such an inconvenience that, in a case where the release operation is performed again after a release operation is brought to a stop by the user, the vibration detecting means 44 must be started over again and then a standby time is necessary until the output of the vibration detection means 44 becomes stable.

If the predetermined time t2 is found at the step S13 to have elapsed after the image-shake correcting control is brought to a stop, the flow proceeds from the step S13 to the step S16 as mentioned above. At the step S16, the vibration detecting action of the vibration detecting means 44 is brought to a stop. After that, the flow returns to the step S2 to wait for the generation of the signal of the switch SW1.

In a case where the IS switch means 43 is found at the step S3 to be not in its on-state, the flow proceeds from the step S3 to the step S17 as mentioned above. At the step S17, the camera CPU 31 gives an instruction for the light-measuring and AF (distance-measuring) actions. The lens CPU 41 then performs a focusing action. After that, the flow proceeds from the step S17 to a step S18.

At the step S18, the camera CPU 31 makes a check to find if the signal of the switch SW2 of the release switch means 34 is generated. If so, the flow proceeds to a step S19. If not, the flow proceeds to a step S20.

At the step S19, the lens CPU 41 controls the diaphragm device 47. At the same time, the camera CPU 31 causes an exposure action to be performed on the film. The flow then proceeds from the step S19 to the step S20.

At the step S20, the camera CPU 31 makes a check for the state of the switch SW1 to find if the signal of the switch SW1 is generated. If so, the flow returns to the step S18. If not, the flow returns to the step S2.

In the lens-changeable AF type single-lens reflex camera system according to the first embodiment, the above-stated sequence of actions are repeated until the power supply switch means 33 is turned off. When the power supply switch means 33 is turned off, the supply of electric power to the lens body 30 is brought to an end by terminating the communication between the camera CPU 31 and the lens CPU 41.

Figure 6:
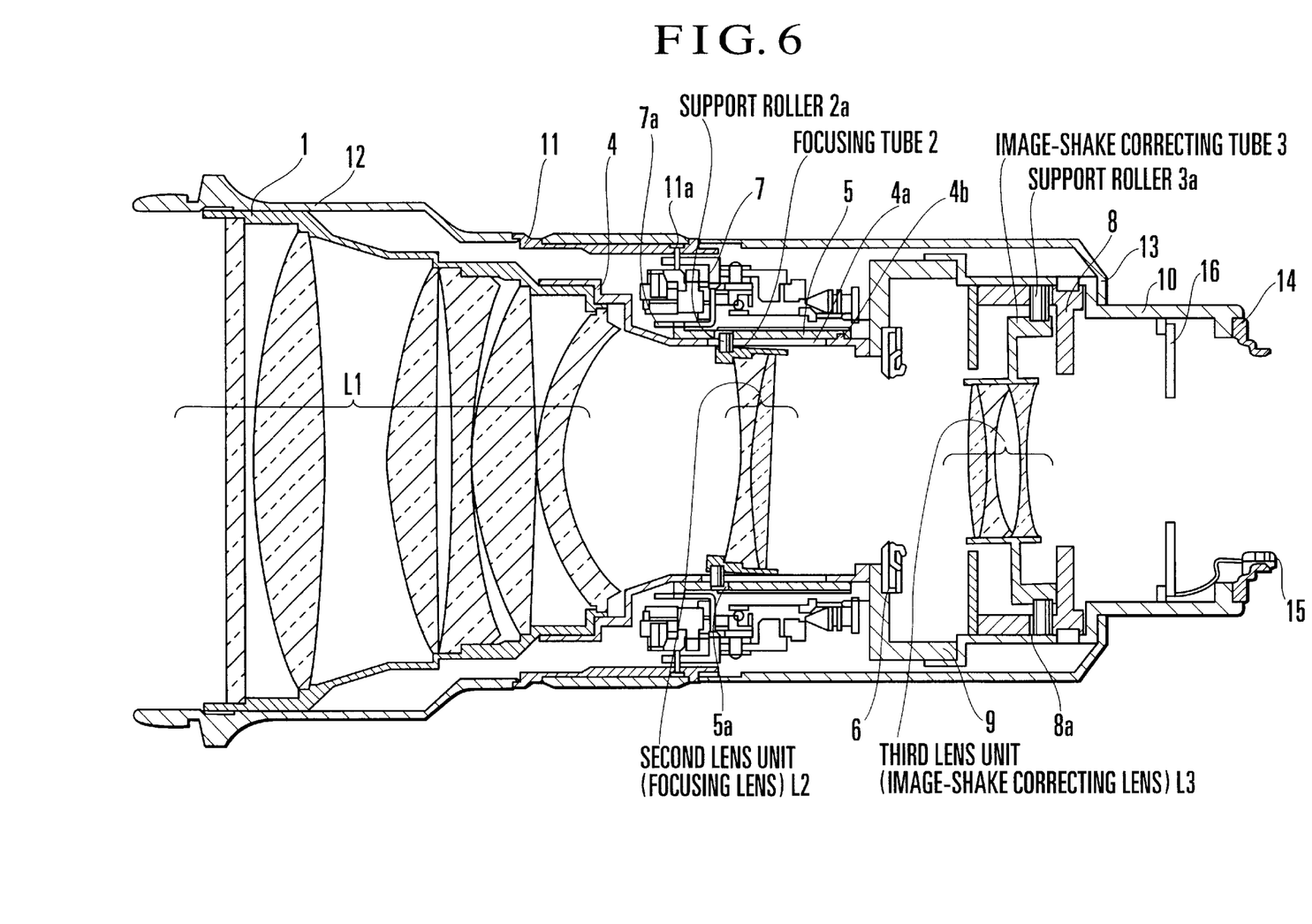
FIG. 6 is a longitudinal sectional view of a lens barrel according to a second embodiment of the invention.

FIG. 6 shows a lens barrel according to a second embodiment of the invention. The same parts as those of the first embodiment are indicated by the same reference numerals in the following description, which is limited, for simplification thereof, to points where the second embodiment differs from the first embodiment.

The optical system of the second embodiment is assumed to be arranged such that, when the second lens unit L2 serving as a focusing lens comes to tilt, a direction in which an image plane tilts is the same as a direction in which the second lens unit L2 tilts, and that, when the third lens unit L3 serving as an image-shake correcting lens comes to tilt, the direction in which the image plane tilts is also the same as a direction in which the third lens unit L3 tilts. Further, in this case, the support rollers 2a are disposed in front of the center of gravity of the focusing tube 2 as viewed in the optical axis direction, while the support rollers 3a are disposed in rear of the center of gravity of the image-shake correcting tube 3 as viewed in the optical axis direction. With the exception of these points, the rest of arrangement of the second embodiment is the same as the first embodiment.

With the second embodiment arranged in the above manner, since the support rollers 2a are disposed in front of the center of gravity of the focusing tube 2 as viewed in the optical axis direction, the image plane is caused to tilt rearward when the second lens unit L2 tilts rearward. Meanwhile, since the support rollers 3a are disposed in rear of the center of gravity of the image-shake correcting tube 3 as viewed in the optical axis direction, the image plane is caused to tilt forward when the third lens unit L3 tilts forward. Therefore, the tilting directions of the image plane thus offset or cancel each other.

While the tilting of the focusing lens and that of the image-shake correcting lens have been described in the description of embodiments given above, the tilting of a zooming lens (magnification varying optical system) and that of the image-shake correcting lens will be next described below.

Figure 7:
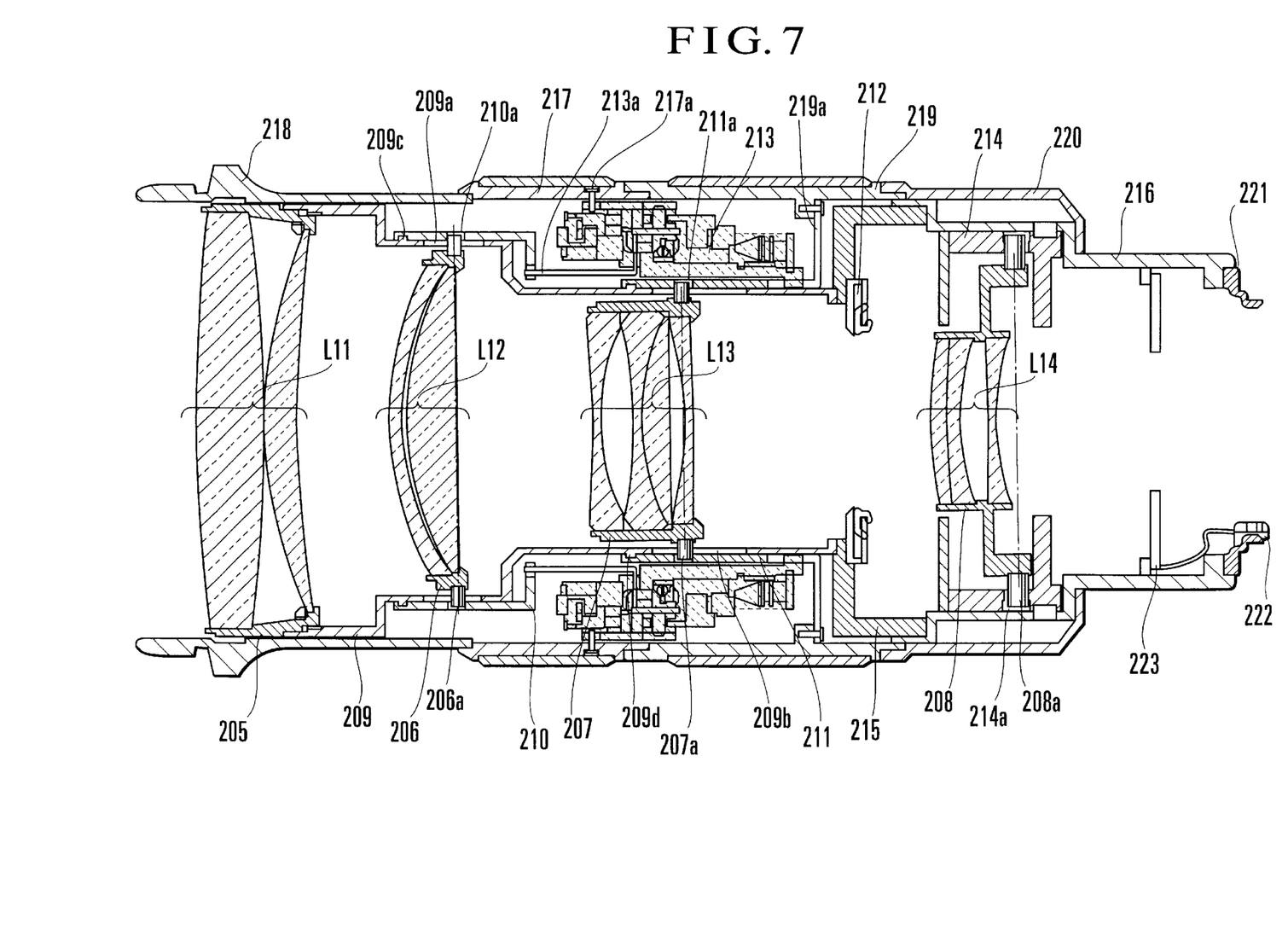
FIG. 7 is a longitudinal sectional view of a lens barrel according to a third embodiment of the invention.

FIG. 7 is a longitudinal sectional view of a lens barrel according to a third embodiment of the invention. The lens barrel includes a first lens unit L11, a second lens unit L12 which is a focusing optical system, a third lens unit L13 which is a magnification varying optical system, and a fourth lens unit L14 which is an image-shake correcting lens. A first-lens-unit tube 205 holds the first lens unit L11 and is mounted on a guide tube 209 integrally therewith. A focusing tube 206 holds the second lens unit L12 and is provided with support rollers 206a. The support rollers 206a are arranged to engage a guide tube 209 and a focusing cam tube (ring) 210, to drive the focusing tube 206 and also to restrain tilting of the focusing tube 206. Further, the support rollers 206a are arranged on the focusing tube 206 at three parts to protrude perpendicular to an optical axis and to have some amount of play with respect to the guide tube 209 and the focusing cam tube (ring) 210 in such a way as to prevent any excessive load from arising at the time of driving.

A magnification varying tube 207 holds the third lens unit L13 and is provided with support rollers 207a. The support rollers 207a engage the guide tube 209 and a magnification varying cam tube 211 and are arranged to drive the magnification varying tube 207 and also to restrain tilting of the magnification varying tube 207. The support rollers 207a on the magnification varying tube 207 are arranged at three parts to protrude perpendicular to the optical axis and to have some amount of play with respect to the guide tube 209 and the magnification varying cam tube 211 in such a way as to prevent any excessive load from arising at the time of driving.

An image-shake correcting tube 208 holds the fourth lens unit L14 and is provided with support rollers 208a. The support rollers 208a engage a fourth-lens-unit holding frame 214 and are arranged to drive the image-shake correcting tube 208 and the also to restrain tilting of the image-shake correcting tube 208. The support rollers 208a on the image-shake correcting tube 207 are arranged at three parts to protrude perpendicular to the optical axis and to have some amount of play with respect to the fourth-lens-unit holding frame 214 in such a way as to prevent any excessive load from arising at the time of driving.

The guide tube 209 is mounted on a connection tube 215 integrally therewith. The guide tube 209 is provided at its three parts with rectilinear motion grooves 209a and 209b which engage the support rollers 206a and 207a and also with projections 209c and 209d which restrict the motion in the direction of the optical axis of the focusing cam ring 210 and that of the magnification varying cam tube 211.

The focusing cam ring 210 engages the outer side of the guide tube 209 and is rotatably held there with its motion in the direction of the optical axis restricted by the projections 209c on the guide tube 209.

The magnification varying cam ring (or tube) 211 engages the outer side of the guide tube 209 and is rotatably held there while its motion in the direction of the optical axis is restricted by the projections 209d on the guide tube 209. Three cam grooves 211a are formed in the magnification varying cam ring 211 to have the support rollers 207a engaging them. A diaphragm 212 is mounted on the connection tube 215 integrally therewith and is arranged to be driven by an actuator (not shown). A focusing actuator 213 is mounted on the guide tube 209 integrally therewith. The rotation of a focusing operation ring 217 and the rotation of an ultrasonic motor disposed inside the focusing actuator 213 are combined to transmit a rotation to the focusing cam ring 210 through a key 213a.

The fourth-lens-unit holding frame 214 is mounted on a fixed tube 216 integrally therewith and has guide grooves (or slots) 214a formed therein to engage the support rollers 208a provided on the image-shake correcting tube 208. The guide grooves 214a are in a shape of slots extending in the direction of circumference and are thus arranged to allow the image-shake correcting tube 208 to vertically and laterally move with respect to the optical axis although they restrict the movement and tilting of the image-shake correcting tube 208 in the direction of the optical axis. The fourth-lens-unit holding frame 214 is further provided with parts (not shown in FIG. 7) for driving the image-shake correcting tube 208 in the same manner as described in the first embodiment with reference to FIG. 3.

The connection tube 215 is arranged mainly to connect the guide tube 209 to the fixed tube 216. On the fixed tube 216 are mounted the connection tube 215, the fourth-lens-unit holding frame 214, an electric circuit board 223 and a mount 221. The focusing operation ring 217 is arranged between a front external ring 218 and a zooming operation ring 219 to be rotatable by the user and to transmit its rotation through a pin 217a to the focusing actuator 213.

The front external ring 218 is mounted on the first-lens-unit tube 205 integrally therewith. The zooming operation ring 219 is arranged between the focusing operation ring 217 and a rear external ring 220 to be rotatable by the user and to transmit its rotation through a zoom key 219a to the magnification varying cam ring 211. The rear external ring 220 is mounted on the fixed tube 216 integrally therewith. The mount 221 is arranged to permit the lens barrel to be mounted on a camera (not shown) by engaging the camera. An electric contact part 222 is mounted on the mount 221 and is arranged to permit communication with the camera and to receive electric power from the camera by contacting with an electric contact part (not shown) provided on the side of the camera. The electric circuit board 223 has a microcomputer, etc., arranged thereon to form an electrical circuit for communication with the camera, for receiving electric power from the camera and for control over the focusing actuator, the diaphragm driving actuator and an image-shake correcting actuator.

The third embodiment is arranged such that, when the magnification varying optical system (third lens unit) L13 comes to tilt, a direction in which an image plane tilts is the same as a direction in which the magnification varying optical system L13 tilts, and, on the other hand, when the image-shake correcting optical system L14 comes to tilt, a direction in which the image plane tilts is opposite to a direction in which the image-shake correcting optical system L14 tilts. Further, even if the focusing optical system L12 tilts, the image plane is caused to tilt to a much smaller degree by the tilting of the focusing optical system L12 than by the tilting of the magnification varying optical system L13 or the image-shake correcting optical system L14. Referring to FIG. 7, the support rollers 207a are disposed in rear of the center of gravity of the magnification varying tube 207 as viewed in the optical axis direction. Therefore, the magnification varying optical system L13 tilts forward in the state of FIG. 7. The support rollers 208a are disposed in rear of the center of gravity of the image-shake correcting tube 208 as viewed in the optical axis direction. Therefore, the image-shake correcting optical system L14 tilts forward in the state of FIG. 7. Under this condition, while the magnification varying optical system L13 tilts forward to cause the image plane to tilt forward, the image-shake correcting optical system L14 tilts forward to cause the image plane to tilt rearward. Therefore, the image plane tilting directions are offset by each other.

In the case of the third embodiment, the image plane tilting directions caused by the tilting direction of the magnification varying optical system and that of the image-shake correcting optical system are in a converse relation. However, in a case where the tilting directions of the magnification varying optical system and the image-shake correcting optical system are in the same relation to the tilting direction of the image plane, i.e., where the tilting direction of the image plane is the same as the tilting direction of the magnification varying optical system and is also the same as the tilting direction of the image-shake correcting optical system, the advantageous effect of the third embodiment can be also likewise attained by the following modification arrangement.

The support part of the magnification varying tube is arranged in rear of the center of gravity of the magnification varying tube to have the magnification varying optical system tilt forward. On the other hand, the support part of the image-shake correcting tube is arranged in front of the center of gravity of the image-shake correcting tube to have the image-shake correcting optical system tilt rearward. By this arrangement, the tilting directions of the magnification varying optical system and the image-shake correcting optical system become opposite to each other to have the respective tilting directions of the image plane offset each other.

The third embodiment has been described above solely in respect of the magnification varying optical system L13 and the image-shake correcting optical system L14. However, a photo-taking optical system can be arranged to have its best optical performance by further considering the relation to the focusing lens to arrange lens units to be supported in an optimum manner according to their optical characteristics.

In the third embodiment, the support rollers supporting each tube are arranged to have equal amounts of play. However, in a case where the rate of causing the image plane to tilt by the tilting of one optical system differs from that of another optical system, the amounts of play of the support rollers may be differently set according to their rates of causing the image plane to tilt. The optical performance of the photo-taking optical system of course can be improved by that modification.

As described in the foregoing, according to the invention, in a lens barrel having a first holding tube holding a first optical system arranged to be driven in a direction perpendicular to an optical axis for correcting an image shake and a second holding tube holding a second optical system arranged to be moved along the optical axis, there are provided a first plurality of projections arranged at the first holding tube to protrude perpendicularly to the optical axis for restraining the first optical system from tilting with respect to the optical axis, and a second plurality of projections arranged at the second holding tube to protrude perpendicularly to the optical axis for restraining the second optical system from tilting with respect to the optical axis, wherein positions of the first plurality of projections and the second plurality of projections are respectively shifted with respect to positions of centers of gravity of the first holding tube and the second holding tube in the optical axis direction, so that the tilting movements of an image plane caused by the tilting of the first optical system and that of the second optical system are cancelled or offset by each other.

What is claimed is:

1. A lens barrel comprising:
    a first holding tube holding a first lens group arranged to be driven in a direction perpendicular to an optical axis for correcting an image shake;
    a second holding tube holding a second lens group arranged to be moved along the optical axis;

said first lens group and said second lens group being located on the same optical axis;

a first plurality of projections arranged at said first holding tube to protrude perpendicularly to the optical axis for restraining said first lens group from tilting with respect to the optical axis; and a second plurality of projections arranged at said second holding tube to protrude perpendicularly to the optical axis for restraining said second lens group from tilting with respect to the optical axis, wherein positions of said first plurality of projections and said second plurality of projections are respectively shifted with respect to positions of centers of gravity of said first holding tube and said second holding tube in the optical axis direction, and wherein, if a direction of tilting of an image plane caused by tilting of said first lens group and a direction of tilting of the image plane caused by tilting of said second lens group are the same, a direction in which the position of said first plurality of projections is shifted with respect to the position of the center of gravity of said first holding tube and a direction in which the position of said second plurality of projections is shifted with respect to the position of the center of gravity of said second holding tube are opposite to each other, and wherein, if a direction of tilting of an image plane caused by tilting of said first lens group and a direction of tilting of the image plane caused by tilting of said second lens group are opposite to each other, a direction in which the position of said first plurality of projections is shifted with respect to the position of the center of gravity of said first holding tube and a direction in which the position of said second plurality of projections is shifted with respect to the position of the center of gravity of said second holding tube are the same.

2. A lens barrel according to claim 1, wherein the positions of said first plurality of projections and said second plurality of projections are shifted in phase.

3. A lens barrel according to claim 1, wherein said second lens group is arranged to move along the optical axis for focusing.

4. A lens barrel according to claim 1, wherein said second lens group is arranged to move along the optical axis for zooming.

5. A lens barrel according to claim 1, wherein:

the second lens group tilts in the direction for correcting the movement of the image due to the tilting of the first lens group.

6. A lens barrel comprising:

a first holding tube holding a first lens group arranged to be driven in a direction perpendicular to an optical axis for correcting an image shake;

a second holding tube holding a second lens group arranged to be moved a long the optical axis;

said first lens group and said second lens group being located on the same optical axis;

a first plurality of projections arranged at said first holding tube to protrude perpendicularly to the optical axis for restraining said first lens group from tilting with respect to the optical axis; and a second plurality of projections arranged at said second holding tube to protrude perpendicularly to the optical axis for restraining said second lens group from tilting with respect to the optical axis;

wherein positions of said first plurality of projections and said second plurality of projections are respectively shifted with respect to positions of centers of gravity of said first holding tube and said second holding tube in the optical axis direction;

wherein, if a direction of tilting of an image plane caused by tilting of said first lens group and a direction of tilting of the image plane caused by tilting of said second lens group are opposite to each other, a direction in which the position of said first plurality of projections is shifted with respect to the position of the center of gravity of said first holding tube and a direction in which the position of said second plurality of projections is shifted with respect to the position of the center of gravity of said second holding tube are the same.

7. A lens barrel comprising:

a first holding tube holding a first lens group arranged to be driven in a direction perpendicular to an optical axis for correcting an image shake;

a second holding tube holding a second lens group arranged to be moved along the optical axis;

said first lens group and said second lens group being located on the same optical axis;

a first plurality of projections arranged at said first holding tube to protrude perpendicularly to the optical axis for restraining said first lens group from tilting with respect to the optical axis; and a second plurality of projections arranged at said second holding tube to protrude perpendicularly to the optical axis for restraining said second lens group from tilting with respect to the optical axis;

wherein positions of said first plurality of projections and said second plurality of projections are respectively shifted with respect to positions of centers of gravity of said first holding tube and said second holding tube in the optical axis direction;

wherein said second lens group tilts in the direction for correcting the movement of the image due to the tilting of said first lens group.

* * * * *